United States Patent
Hwang et al.

(10) Patent No.: US 8,480,539 B2
(45) Date of Patent: Jul. 9, 2013

(54) HYDRAULIC PRESSURE CONTROL APPARATUS FOR AUTOMATIC TRANSMISSION AND CONTROL METHOD THEREOF

(75) Inventors: Jin Young Hwang, Suwon-si (KR); Se Hwan Jo, Goyang-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/533,796

(22) Filed: Jun. 26, 2012

(65) Prior Publication Data

US 2013/0134004 A1  May 30, 2013

(30) Foreign Application Priority Data

Nov. 29, 2011  (KR) .................. 10-2011-0126330

(51) Int. Cl.
*F16H 61/30* (2006.01)
(52) U.S. Cl.
USPC ........................... 477/159; 477/157; 477/158
(58) Field of Classification Search
USPC ................... 477/156, 157, 158, 159
See application file for complete search history.

(56) References Cited

U.S. PATENT DOCUMENTS

| 7,677,997 B2 * | 3/2010 | Hiramatsu et al. ............. 474/28 |
| 7,715,967 B2 * | 5/2010 | Kim et al. ..................... 701/53 |
| 2006/0111208 A1 * | 5/2006 | Hiramatsu et al. ............. 474/28 |
| 2011/0082630 A1 * | 4/2011 | Kawaguchi et al. ........... 701/58 |

FOREIGN PATENT DOCUMENTS

| JP | 2010-096304 A | 4/2010 |
| JP | 2011-112215 A | 6/2011 |
| KR | 1020050070725 A | 7/2005 |

* cited by examiner

*Primary Examiner* — Ha D Ho
(74) *Attorney, Agent, or Firm* — Morgan, Lewis & Bockius LLP

(57) ABSTRACT

A hydraulic pressure control apparatus for an automatic transmission may include a first hydraulic pump connected with an oil tank to receive oil from the oil tank, having a first motor, and adapted to generate a low pressure through an operation of the first motor, a second hydraulic pump connected with the first hydraulic pump to receive the low pressure, having a second motor, and adapted to generate a high pressure through an operation of the second motor, a first regulating valve adapted to receive the low pressure from the first hydraulic pump and to regulate a first operating pressure to supply to the torque converter, and a second regulating valve adapted to receive the high pressure from the second hydraulic pump and to regulate a second operating pressure to supply to the powertrain.

7 Claims, 5 Drawing Sheets

HYDRAULIC PRESSURE CONTROL APPARATUS FOR AUTOMATIC TRANSMISSION AND CONTROL METHOD THEREOF

CROSS-REFERENCE TO RELATED APPLICATION

The present application claims priority of Korean Patent Application Number 10-2011-0126330 filed Nov. 29, 2011, the entire contents of which application is incorporated herein for all purposes by this reference.

BACKGROUND OF INVENTION

1. Field of Invention

The present invention relates to a hydraulic pressure control apparatus for an automatic transmission and a control method thereof. More particularly, the present invention relates to a hydraulic pressure control apparatus for an automatic transmission, and a control method thereof, that is provided with two oil pumps.

2. Description of Related Art

Generally, an automatic transmission includes a torque converter and a powertrain. In addition, the powertrain realizes multiple shifts by being connected with the torque converter. Further, a hydraulic pump (electric oil pump) is provided so as to supply operating pressure to the automatic transmission, and a TCU (transmission control unit) is provided so as to control operation of the automatic transmission.

The hydraulic pump should be operated at an optimal rotation speed so as to generate a necessary operating pressure for the automatic transmission. Conventionally, a data map of the rotation speed is predetermined so as to generate a target hydraulic pressure, a hydraulic pressure sensor detects whether the operating pressure reaches the target hydraulic pressure, and the motor rotation speed is controlled by feedback of the detected value.

Because the hydraulic pressure sensor having high accuracy and durability is required for the hydraulic pressure control method according to the prior art, the production cost may be increased. In addition, the hydraulic pressure cannot be normally detected and a malfunction of the feedback control may occur due to fluctuation or vibration of hydraulic pressure.

Further, according to the prior art where the data map is predetermined, power loss may be increased since a criterion is determined by considering deviation of the hydraulic pump and the hydraulic pressure sensor. Furthermore, it may be impossible to control the pump by reflecting or compensating deterioration of durability and performance.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for an automatic transmission and a control method thereof having advantages of reducing power loss by deviation of a hydraulic pressure sensor.

Various aspects of the present invention provide for a hydraulic pressure control apparatus for an automatic transmission and a control method thereof having further advantages of improving reliability by preventing detection errors of hydraulic pressure and malfunctions of feedback control.

And various aspects of the present invention provide for a hydraulic pressure control apparatus for an automatic transmission that is applied to a torque converter and a powertrain.

The apparatus may include an oil tank storing oil, a first hydraulic pump connected with an oil tank to receive oil from the oil tank, having a first motor, and adapted to generate a low pressure through an operation of the first motor, a second hydraulic pump connected with the first hydraulic pump to receive the low pressure, having a second motor, and adapted to generate a high pressure through an operation of the second motor, a first regulating valve adapted to receive the low pressure from the first hydraulic pump and to regulate a first operating pressure to supply to the torque converter, and a second regulating valve adapted to receive the high pressure from the second hydraulic pump and to regulate a second operating pressure to supply to the powertrain.

The apparatus may include a control unit adapted to control operation of the first and second regulating valves.

The apparatus may include a first switch mounted at the first regulating valve to detect information on the hydraulic pressure of the first regulating valve and adapted to transmit the information to the control unit, and a second switch mounted at the second regulating valve to detect information on the hydraulic pressure of the second regulating valve and adapted to transmit the information to the control unit.

The apparatus may include a variable control solenoid valve adapted to provide a control pressure to the first and second regulating valves.

The first regulating valve may include a first valve body provided with a plurality of ports and including one end and another end, a first valve spool movably mounted in the first valve body and adapted to perform switching of oil passage, and an elastic member adapted to always push the first valve spool to the end of the first valve body.

The plurality of ports may include a first port adapted to receive the low pressure from the first hydraulic pump, a second port adapted to selectively communicate with the first port through a movement of the first valve spool so as to selectively supply the first operating pressure to the torque converter, a third port adapted to receive a portion of the first operating pressure as the control pressure, and a fourth port adapted to selectively communicate with the second port through the movement of the first valve spool so as to exhaust the first operating pressure.

The first switch may be mounted at the one end of the first valve body, and is adapted to detect information of the hydraulic pressure according to the movement of the first valve spool.

The first switch may include a first node adapted to move together with the first valve spool, and a second node fixedly connected to the first valve body, wherein the first node is adapted to selectively contact the second node by moving together with the first valve spool.

The first switch may include a spring always applying an elastic force to the first node toward the second node.

The control unit may be adapted to control the first motor according to a contacting state of the first node and the second node.

The first regulating valve may include a fifth port adapted to receive the control pressure of the variable control solenoid valve.

The second regulating valve may include a second valve body provided with a plurality of ports, and including one end and another end, a second valve spool movably mounted in the second valve body and adapted to perform switching of oil passage, and an elastic member adapted to always push the second valve spool to the end of the second valve body.

The plurality of ports may include a first port adapted to receive the low pressure from the second hydraulic pump, a second port adapted to selectively communicate with the first port through a movement of the second valve spool so as to selectively supply the second operating pressure to the torque converter, a third port adapted to receive a portion of the second operating pressure as the control pressure, and a fourth port adapted to selectively communicate with the second port through the movement of the second valve spool so as to exhaust the second operating pressure.

The second switch may be mounted at the one end of the second valve body, and is adapted to detect information of the hydraulic pressure according to the movement of the second valve spool.

The second switch may include a third node adapted to move together with the second valve spool, and a fourth node fixedly connected to the second valve body, wherein the third node is adapted to selectively contact the fourth node by moving together with the first valve spool.

The second switch may include a spring always applying an elastic force to the third node toward the fourth node.

The control unit may be adapted to control the second motor according to a contacting state of the third node and the fourth node.

The second regulating valve may include a fifth port adapted to receive the control pressure of the variable control solenoid valve.

A hydraulic pressure control method for an automatic transmission controls a hydraulic pressure control apparatus which has a first hydraulic pump having a first motor and generating a low pressure, a second hydraulic pump having a second motor and generating a high pressure, a first regulating valve having a first valve spool and regulating the low pressure received from the first hydraulic pump as a first operating pressure so as to supply the first operating pressure to a torque converter, a second regulating valve having a second valve spool and regulating the high pressure received from the second hydraulic pump as a second operating pressure so as to supply the second operating pressure to a powertrain, a variable control solenoid valve changing a target hydraulic pressure of the first and second regulating valves, a control unit controlling the first and second motors and the variable control solenoid valve, and first and second switches respectively transmitting information on the hydraulic pressure of the first and second regulating valves.

The method may include determining whether both of the first and second switches are in ON positions, determining whether a control pressure of the variable control solenoid valve is decreased when both of the first and second switches are in the ON positions, controlling an RPM of the second motor to be an optimal RPM when the control pressure of the variable control solenoid valve is decreased, and controlling an RPM of the first motor to be an optimal RPM when the control of the second motor is completed.

The control unit may receive the information on the hydraulic pressure of the first and second regulating valves by detecting ON/OFF positions of the first and second switches.

The control unit, when at least one of the first and second switches is in the OFF position, may redetermine whether both of the first and second switches are in the ON positions after increasing the RPM of the motor connected to the switch in the OFF position.

The RPM of the motors connected to the first and second switches may be maintained when both of the first and second switches are in the ON positions.

The control unit may redetermine whether both of the first and second switches are in the ON positions when the control pressure of the variable control solenoid valve is not decreased.

The controlling the RPM of the second motor to be the optimal RPM may include determining whether the second switch is in the OFF position, maintaining the RPM of the second motor after increasing the RPM of the second motor by a predetermined value when the second switch is in the OFF position, and decreasing the RPM of the second motor when the second switch is in the ON position, wherein the control unit redetermines whether both of the first and second switches are in the ON positions when the control pressure of the variable control solenoid valve is increased while decreasing the RPM of the second motor.

The controlling the RPM of the first motor to be the optimal RPM may include determining whether the first switch is in the OFF position, maintaining the RPM of the first motor after increasing the RPM of the first motor by a predetermined value when the first switch is in the OFF position, and decreasing the RPM of the first motor when the first switch is in the ON position, wherein the control unit redetermines whether both of the first and second switches are in the ON positions when the control pressure of the variable control solenoid valve is increased while decreasing the RPM of the first motor.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 1:
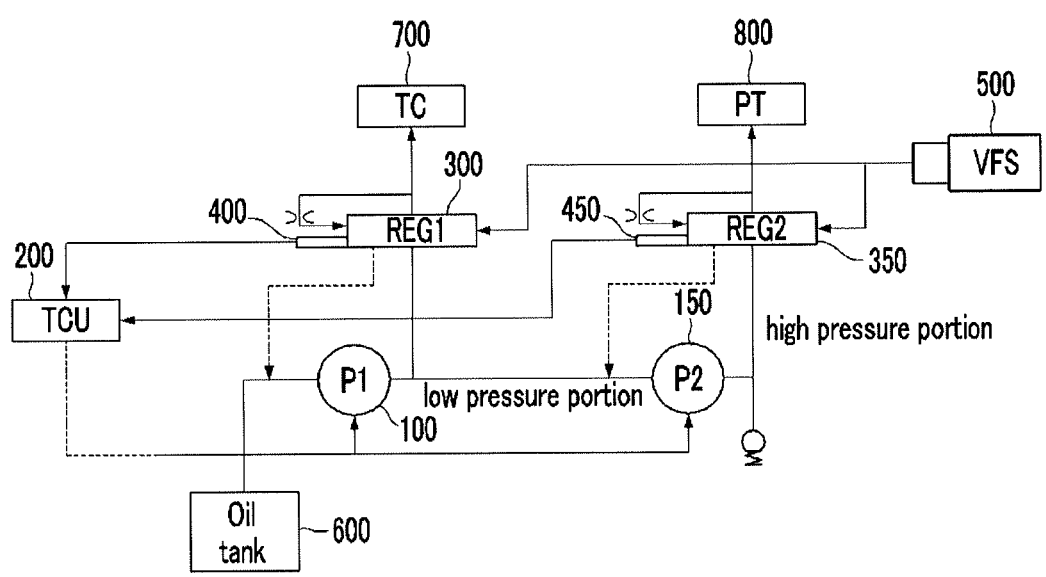
FIG. 1 is a schematic diagram of an exemplary hydraulic pressure control apparatus for an automatic transmission according to the present invention.

FIG. 1 is a schematic diagram of a hydraulic pressure control apparatus for an automatic transmission according to various embodiments of the present invention.

As shown in FIG. 1, a hydraulic pressure control apparatus for an automatic transmission according to various embodiments of the present invention includes a torque converter 700, a powertrain 800, a first hydraulic pump 100, a second hydraulic pump 150, a first regulating valve 300, a second regulating valve 350, a control unit 200, a first switch 400, a second switch 450, and a variable control solenoid valve 500.

The torque converter 700 is adapted to transfer torque by using fluid and to amplify the torque. The torque converter 700 is provided in a general automatic transmission and is well-known to a person of ordinary skill in the art. Therefore, a detailed description thereof will be omitted.

The powertrain 800 is adapted to transfer output of an engine to a wheel, and is provided with clutches, brakes, a transmission, an impellent shaft, planetary gear sets, and a drive shaft. The powertrain 800 is provided to the general automatic transmission, and is well-known to a person of ordinary skill in the art. Therefore, a detailed description thereof will be omitted.

The first hydraulic pump 100 supplies oil supplied from an oil tank 600 to the torque converter 700 and a high pressure portion by pumping the oil. In addition, the first hydraulic pump 100 is disposed at a low pressure portion of the hydraulic pressure control apparatus. Further, a first motor 110 is disposed at the first hydraulic pump 100 and the first hydraulic pump 100 pumps the oil by operation of the first motor 110.

The second hydraulic pump 150 supplies oil supplied from the first hydraulic pump 100 to the powertrain 800 by pumping. In addition, the high pressure portion of the hydraulic pressure control apparatus is formed as a consequence of the second hydraulic pump 150 again pumping the oil supplied from the first hydraulic pump 100. Further, a second motor 160 is disposed at the second hydraulic pump 150 and the second hydraulic pump 150 pumps the oil by operation of the second motor 160.

The first regulating valve 300 is disposed between the first hydraulic pump 100 and the torque converter 700 so as to maintain hydraulic pressure supplied to the torque converter 700 to be constant In other words, the oil pumped by the first hydraulic pump 100 is supplied via the first regulating valve 300 to the torque converter 700.

The second regulating valve 350 is disposed between the second hydraulic pump 150 and the powertrain 800 so as to maintain hydraulic pressure supplied to the powertrain 800 to be constant. In other words, the oil pumped by the second hydraulic pump 150 is supplied via the second regulating valve 350 to the torque converter 700.

The control unit 200 is connected with the first regulating valve 300 and the second regulating valve 350. In addition, the control unit 200 determines whether each of hydraulic pressures of the first regulating valve 300 and the second regulating valve 350 reach each target hydraulic pressure. On the other hand, the control unit 200 is connected with the first hydraulic pump 100 and the second hydraulic pump 150. Further, the control unit 200 controls pumping of the first hydraulic pump 100 and the second hydraulic pump 150

In other words, the control unit 200 controls an RPM of the first and second motors 110 and 160.

The first switch 400 is a node switch that includes a first node 410 and a second node 420. In addition, the first switch 400 is mounted on an end of the first regulating valve 300. Further, the first node 410 and the second node 420 are in contact and the first switch 400 enters an on position when hydraulic pressure of the first regulating valve 300 reaches the target hydraulic pressure. In other words, the on position of the first switch 400 means that the first switch 400 can flow a current, and the control unit 200 determines whether hydraulic pressure of the first regulating valve 300 reaches the target hydraulic pressure according to a position of the first switch 400.

The second switch 450 is a node switch that includes a third node 460 and a fourth node 470. In addition, an explanation regarding compositions of the second switch 450, the second regulating valve 350, and the control unit 200 are similar to the above-mentioned explanations of the first switch 400. Therefore, the repeated explanation thereof will be omitted.

The variable control solenoid valve 500 is connected to the first regulating valve 300 and the second regulating valve 350 so as to change the target hydraulic pressure of the first regulating valve 300 and the second regulating valve 350. In other words, the target hydraulic pressure can be changed according to control pressure of the variable control solenoid valve 500.

Figure 2:
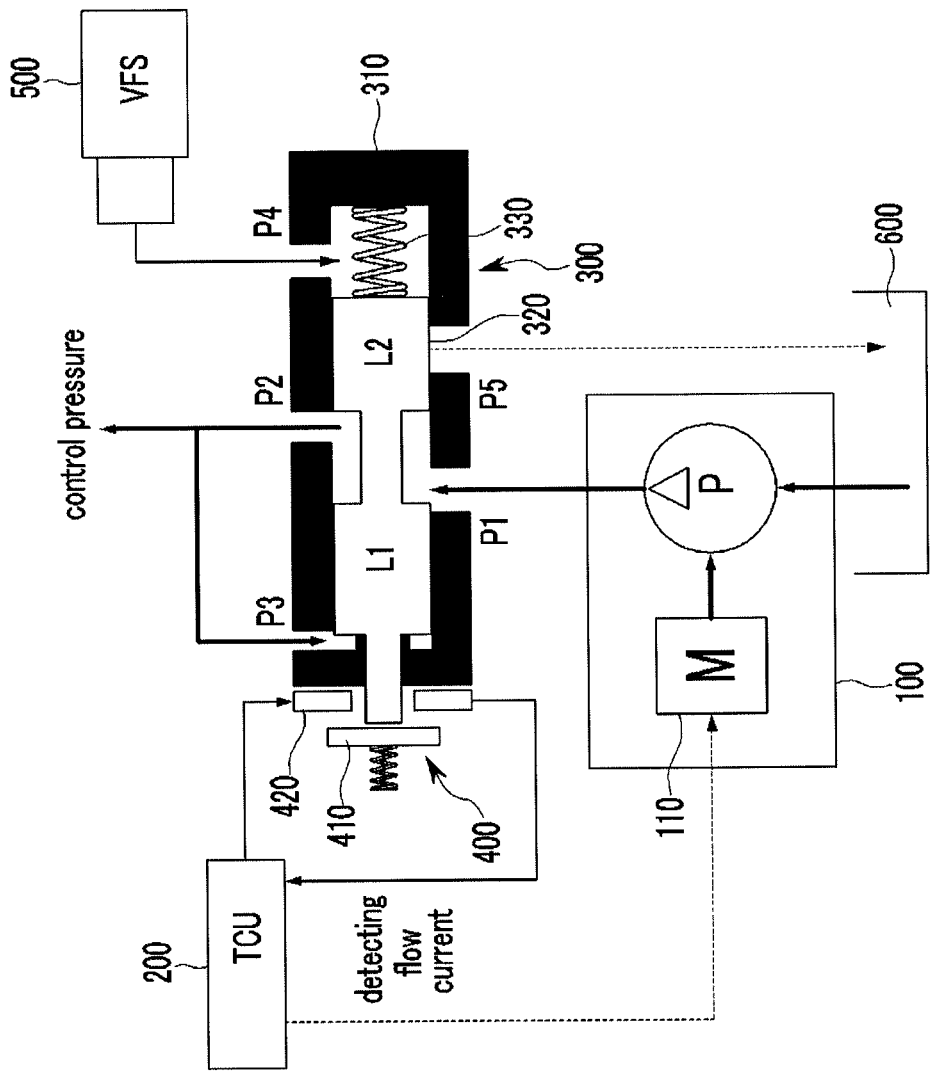
FIG. 2 is a detailed diagram of an exemplary hydraulic pressure control apparatus for an automatic transmission according to the present invention.

FIG. 2 is a detailed diagram of a hydraulic pressure control apparatus for an automatic transmission according to various embodiments of the present invention.

As shown in FIG. 2, the first regulating valve 300 includes a first valve body 310 and a first valve spool 320, and the first switch 400 is mounted on the end thereof.

A plurality of ports P1, P2, P3, P4, and P5 are formed at the first valve body 310. In addition, the plurality of ports P1, P2, P3, P4, and P5 are formed by penetrating the first valve body 310 so as to communicate inside and outside thereof. Further, a penetration hole 311 is formed at the end of the first valve body 310.

The first valve spool 320 is inserted into the first valve body 310 to be slidable along a length direction thereof. The first valve spool 320 includes a first land L1 and a second land L2 fitted in an inner portion of the first valve body 310, and a spool shaft S formed to be substantially thinner than the first and second lands L1 and L2 and connecting the first land L1 with the second land L2. In addition, an elastic member 330 is provided between an end of the first valve spool 320 and an interior surface of the first valve body 310, and thus the first valve spool 320 is pushed to a side of the first valve body 310 in the length direction thereof. Further, a pressing portion 321 is protruded from the other end of the first valve spool 320. The pressing portion 321 is inserted into the penetration hole 311 and is selectively protruded out of the first valve body 310.

The oil pumped by the first hydraulic pump 100 is supplied to the first port P1 of the first valve body 310. Oil having flowed into the first valve body 310 through the first port P1 selectively flows out of the first valve body 310 through the second port P2 according to movement of the first valve spool 320, and the oil having flowed out from the second port P2 of the first valve body 310 is supplied to the torque converter 700. In addition, a portion of the oil having flowed out from the second port P2 of the first valve body 310 is again supplied through the third port P3 as a control pressure of the first valve spool 320. Further, the fourth port P4 of the first valve body 310 selectively communicates with the second port P2 according to the movement of the first valve spool 320, and oil in the first valve body 310 is exhausted through the fourth port P4 of the first valve body 310 so as to be supplied to the first hydraulic pump 100. On the other hand, a control pressure of the variable control solenoid valve 500 is supplied to the first valve body 310 through the fifth port P5.

The first switch 400 is mounted at the end of the first valve body 310 where the penetration hole 311 is formed. In addition, the first node 410 is provided to be pushed by the pressing portion that is protruded to the outside from the first valve body 310, and the second node 420 is fixed at the first valve body 310. Further, a spring 430 is mounted at an end of the first node 410 so as to push the first node 410 in an opposite direction of the pressing portion 321. In other words, the first node 410 and the second node 420 contact with or are separated from each other by operation of the first node 410.

The control unit 200 is connected with the first switch 400 and detects whether the first switch 400 can flow the current. In addition, the control unit 200 controls an RPM of the first motor 110 according to the detected information on whether the first switch 400 can flow the current so as to control pumping of the first hydraulic pump 100.

The second regulating valve 350 includes a second valve body 360 and a second valve spool 370, and the second switch 450 is mounted on the end thereof.

A plurality of ports P1, P2, P3, P4, and P5 are formed at the second valve body 360. In addition, the plurality of ports P1, P2, P3, P4, and P5 are formed by penetrating the second valve body 360 so as to communicate inside and outside thereof. Further, a penetration hole 311 is formed at the end of the second valve body 360.

The second valve spool 370 is inserted into the second valve body 360 to be slidable along a length direction thereof. The second valve spool 370 includes a first land L1 and a second land L2 fitted in an inner portion of the second valve body 360, and a spool shaft S formed to be substantially thinner than the first and second lands L1 and L2 and connecting the first land L1 with the second land L2. In addition, an elastic member 330 is provided between an end of the second valve spool 370 and an interior surface of the second valve body 360, and thus the second valve spool 370 is pushed to a side of the second valve body 360 in the length direction thereof. Further, a pressing portion 321 is protruded from the other end of the second valve spool 370. The pressing portion 321 is inserted into the penetration hole 311, and is selectively protruded out of the second valve body 360.

The oil pumped by the second hydraulic pump 150 is supplied to the first port P1 of the second valve body 360. Oil having flowed into the second valve body 360 through the first port P1 selectively flows out of the second valve body 360 through the second port P2 according to movement of the second valve spool 370, and the oil having flowed out of the second port P2 of the second valve body 360 is supplied to the powertrain 800. In addition, a portion of the oil having flowed out from the second port P2 of the second valve body 360 through the second port P2 is again supplied through the third port P3 as a control pressure of the second valve spool 370. Further, the fourth port P4 of the second valve body 360 selectively communicates with the second port P2 according to the movement of the second valve spool 370, and oil in the second valve body 360 is exhausted through the fourth port P4 of the second valve body 360 so as to be supplied to the second hydraulic pump 150. On the other hand, a control pressure of the variable control solenoid valve 500 is supplied to the second valve body 360 through the fifth port P5.

The second switch 450 is mounted on the end of the second valve body 360 where the penetration hole 311 is formed. In addition, the third node 460 is provided to be pushed by the pressing portion that is protruded to the outside from the second valve body 360, and the fourth node 470 is fixed at the second valve body 360. Further, a spring 430 is mounted at an end of the third node 460 so as to push the third node 460 in an opposite direction of the pressing portion 321. In other words, the third node 460 and the fourth node 470 contact with or are separated from each other by operation of the third node 460.

The control unit 200 is connected with the second switch 450 and detects whether the second switch 450 can flow the current. In addition, the control unit 200 controls an RPM of the second motor 160 according to the detected information on whether the second switch 450 can flow the current so as to control pumping of the second hydraulic pump 150.

Figure 3:
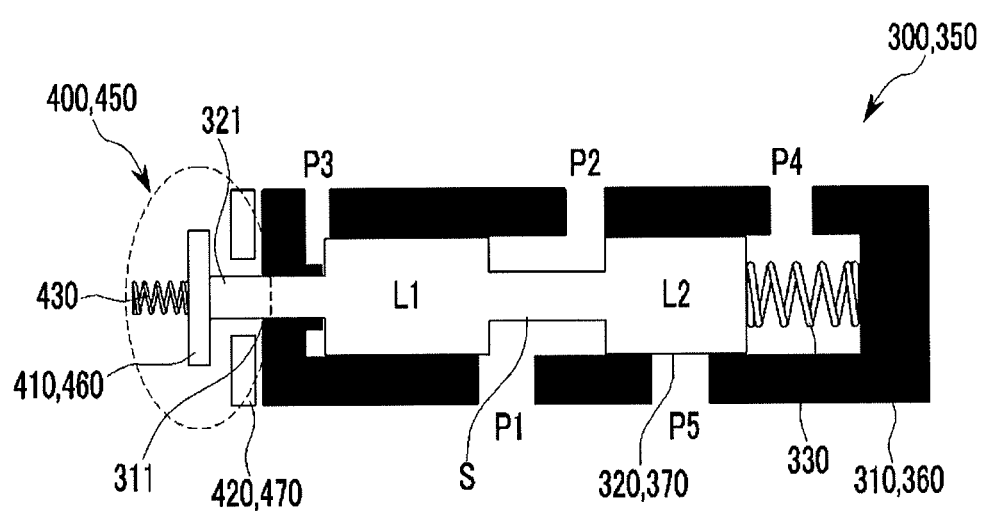
FIG. 3 is a diagram for illustrating an exemplary node switch in a current-interruption state according to the present invention.
Figure 4:
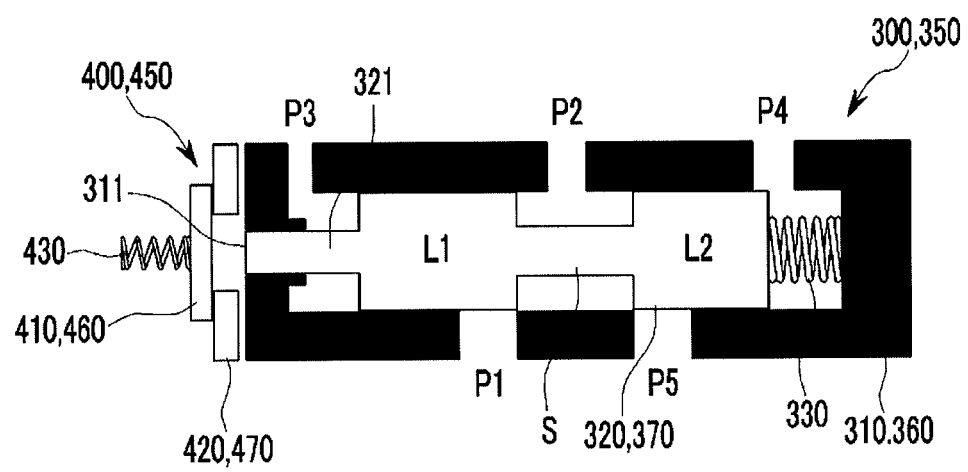
FIG. 4 is a diagram for illustrating an exemplary node switch at a current-supplying state according to the present invention.

Referring to FIG. 3 and FIG. 4, operations of the first regulating valve 300 and the first switch 400 will be described in detail. Operations of the second regulating valve 350 and the second switch 450 are similar to those of the first regulating valve 300 and the first switch 400, and thus the repeated explanations will be omitted.

FIG. 3 is a diagram for illustrating a node switch in a current interruption state according to various embodiments of the present invention. In addition, FIG. 4 is a diagram for illustrating a node switch in a current supplying state according to various embodiments of the present invention.

As shown in FIG. 3, the first valve spool 320 is pushed to one side of the first valve body 310 in the length direction thereof, and the pressing portion 321 is protruded out of the first valve body 310 when the first valve spool 320 is pushed by the elastic member 330. In addition, the first node 410 and the second node 420 are separated from each other, and the first switch 400 enters a current interruption state when the first node 410 is pushed by the pressing portion 321 protruded out of the first valve body 310. In this specification and claims, the current interruption state is denoted by an OFF position.

As shown in FIG. 4, the first valve spool 320 is moved in a direction where the elastic member 330 is pushed when the oil flows through the first port P1 into an inner space of the first valve body 310 where the spool shaft S is disposed. In other words, the pressing portion 321 protruded out of the first valve body 310 is moved into the inner portion of the first valve body 310. In addition, the first node 410 contacts the second node 420 by the spring 430 when the pressing portion 321 does not push it. In this specification and claims, the current supplying state is denoted by an ON position. Further, the ON positions of the switches 400 or 450 mean that hydraulic pressures of the regulating valves 300 and 350 reach the target hydraulic pressures.

Meanwhile, the target hydraulic pressures of the regulating valves 300 and 350 can be changed by receiving the changed control pressure from the variable control solenoid valve 500 through the fifth port P5.

Figure 5:
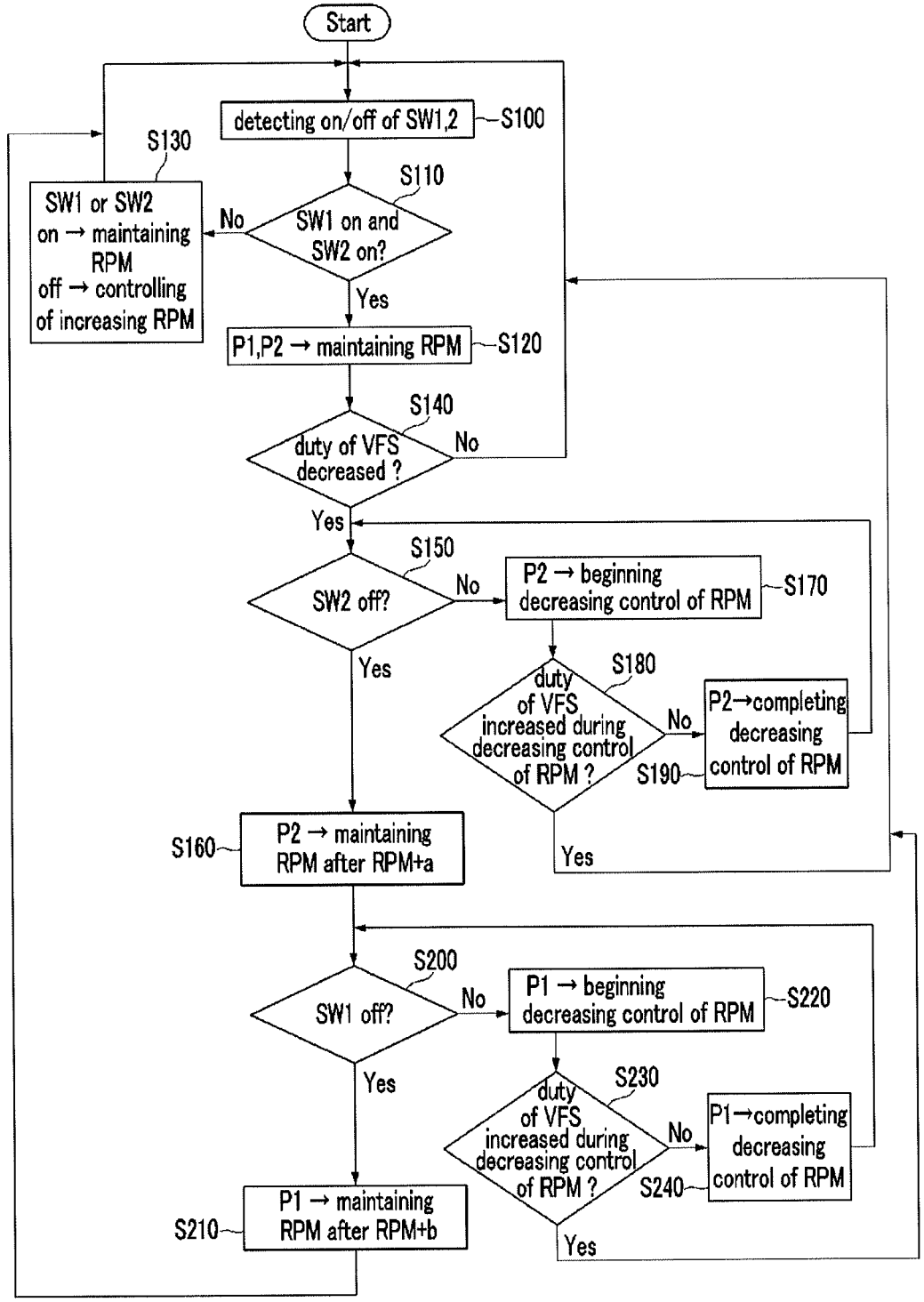
FIG. 5 is a flowchart of an exemplary hydraulic pressure control method for an automatic transmission according to the present invention.

FIG. 5 is a flowchart of a hydraulic pressure control method for an automatic transmission according to various embodiments of the present invention.

As shown in FIG. 5, the control unit 200 detects the ON/OFF positions of the first and second switches 400 and 450 at step S100, and determines whether both of the first and second switches 400 and 450 are in the ON positions at step S110.

If either of the first and second switches 400 and 450 is not in the ON position at the step S110, the control unit 200 maintains the RPM of the motors 110 and 160 connected to the ON-positioned switches 400 and 450 and increases the RPM of the motors 110 and 160 connected to the OFF-positioned switches 400 and 450 at step S130.

If both of the first and second switches 400 and 450 are in the ON positions at the step S110, the control unit 200 maintains both of the RPM of the motors 110 and 160 disposed at the first and second hydraulic pumps 100 and 150 at a step S120. In addition, the control unit 200 determines whether the control pressure of the variable control solenoid valve 500 is decreased at step S140. Herein, the control pressure of variable control solenoid valve 500 is the target hydraulic pressure of the first and second regulating valves, and the target hydraulic pressure of the first regulating valve may be about half of that of the second regulating valve.

If the control pressure is not decreased at the step S140, the above-mentioned steps are repeated from the step S100. In other words, the step S100 is repeated when the control pressure is maintained or increased.

If the control pressure is decreased at the step S140, the RPM of the motors 110 and 160 connected with the switches 400 and 450 are controlled to be optimal RPM.

Firstly, the control unit 200 determines whether the second switch 450 is in the OFF position at step S150.

If the second switch 450 is not in the OFF position at the step S150, the control unit 200 decreases the RPM of the second motor 160 at step S170. In addition, the control unit 200 determines whether the control pressure of the variable control solenoid valve 500 is increased at step S180 while the RPM of the second motor 160 is decreased.

If the control pressure is increased at the step S180, the above-mentioned steps are repeated from the step S100. In addition, if the control pressure of the variable control solenoid valve 500 is not increased at the step S180 while the RPM of the second motor 160 is decreased at the step S170, the above-mentioned steps are repeated from the step S150 after a decrease of the RPM of the second motor 160 is completed at step S190.

If the second switch 450 is in the OFF position at the step S150, the control unit 200 increases the RPM of the second motor 160 by a set value and maintains the RPM at the increased speed. In addition, the control unit 200 determines whether the first switch 400 is in the OFF position at step S200.

If the first switch 400 is not in the OFF position at the step S200, the control unit 200 decreases the RPM of the first motor 110 at step S220. In addition, the control unit 200 determines whether the control pressure of the variable control solenoid valve 500 is increased at step S230 while the RPM of the first motor 110 is decreased at the step S220.

If the control pressure is increased at the step S230, the above-mentioned steps are repeated from the step S100. In addition, if the control pressure of the variable control solenoid valve 500 is not increased at the step S230 while the RPM of the first motor 110 is decreased at the step S220, the above-mentioned steps are repeated from the step S200 after a decrease of the RPM of the first motor 110 is completed at step S240.

If the first switch 400 is in the OFF position at the step S200, the control unit 200 increases the RPM of the first motor 110 by a set value and maintains the RPM at the increased speed in S210. Then, the above-mentioned steps are repeated from the step S100.

According to various embodiments of the present invention, a hydraulic pressure sensor can be omitted since hydraulic pressure is detected by using node switches 400 and 450. Thus, a power loss by deviation of the hydraulic pressure sensor can be eliminated. In addition, durability and reliability of a hydraulic pressure control apparatus for an automatic transmission can be enhanced.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hydraulic pressure control method for an automatic transmission that comprises a first hydraulic pump having a first motor and generating a low pressure, a second hydraulic pump having a second motor and generating a high pressure, a first regulating valve having a first valve spool and regulating the low pressure received from the first hydraulic pump as a first operating pressure to supply the first operating pressure to a torque converter, a second regulating valve having a second valve spool and regulating the high pressure received from the second hydraulic pump as a second operating pressure to supply the second operating pressure to a powertrain, a variable control solenoid valve changing a target hydraulic pressure of the first and second regulating valves, a control unit controlling the first and second motors and the variable control solenoid valve, and first and second switches respectively transmitting information on the hydraulic pressure of the first and second regulating valves, the method comprising:
   determining whether both of the first and second switches are in ON positions;
   determining whether a control pressure of the variable control solenoid valve is decreased when both of the first and second switches are in their respective ON positions;
   controlling an RPM of the second motor to be an optimal RPM when the control pressure of the variable control solenoid valve is decreased; and
   controlling an RPM of the first motor to be an optimal RPM when the control of the second motor is completed.

2. The method of claim 1, wherein the control unit receives the information on the hydraulic pressure of the first and second regulating valves by detecting ON/OFF positions of the first and second switches.

3. The method of claim 1, wherein the control unit, when at least one of the first and second switches is in the respective OFF position, redetermines whether both of the first and second switches are in their respective ON positions after increasing the RPM of the motor connected to the switch in the respective OFF position.

4. The method of claim 1, wherein the RPM of the motors connected to the first and second switches are maintained when both of the first and second switches are in their respective ON positions.

5. The method of claim 1, wherein the control unit redetermines whether both of the first and second switches are in their respective ON positions when the control pressure of the variable control solenoid valve is not decreased.

6. The method of claim 1, wherein controlling the RPM of the second motor to be the optimal RPM comprises:
   determining whether the second switch is in the respective OFF position;

maintaining the RPM of the second motor after increasing the RPM of the second motor by a predetermined value when the second switch is in the respective OFF position; and decreasing the RPM of the second motor when the second switch is in the respective ON position, wherein the control unit redetermines whether both of the first and second switches are in their respective ON positions when the control pressure of the variable control solenoid valve is increased while decreasing the RPM of the second motor.

7. The method of claim 1, wherein controlling the RPM of the first motor to be the optimal RPM comprises:

determining whether the first switch is in the respective OFF position;

maintaining the RPM of the first motor after increasing the RPM of the first motor by a predetermined value when the first switch is in the respective OFF position; and decreasing the RPM of the first motor when the first switch is in the respective ON position, wherein the control unit redetermines whether both of the first and second switches are in their respective ON positions when the control pressure of the variable control solenoid valve is increased while decreasing the RPM of the first motor.

* * * * *